(12) United States Patent
Zimnicki

(10) Patent No.: US 12,710,613 B2
(45) Date of Patent: Aug. 18, 2026

(54) APPARATUSES AND METHODS FOR MODULAR OPTICAL FIBER FURCATION

(71) Applicant: Belden Inc., St. Louis, MO (US)

(72) Inventor: James John Zimnicki, Richmond, IN (US)

(73) Assignee: BELDEN INC., St. Louis, MO (US)

( * ) Notice: Subject to any disclaimer, the term of this patent is extended or adjusted under 35 U.S.C. 154(b) by 456 days.

(21) Appl. No.: 18/084,291

(22) Filed: Dec. 19, 2022

(65) Prior Publication Data

US 2023/0194818 A1 Jun. 22, 2023

Related U.S. Application Data

(60) Provisional application No. 63/291,916, filed on Dec. 20, 2021.

(51) Int. Cl.
*G02B 6/50* (2006.01)

(52) U.S. Cl.
CPC .................................... *G02B 6/50* (2013.01)

(58) Field of Classification Search
CPC ..... G02B 6/4471; G02B 6/44715; G02B 6/50
See application file for complete search history.

(56) References Cited

U.S. PATENT DOCUMENTS

| | | | |
|---|---|---|---|
| 6,434,316 | B1 | 8/2002 | Grois et al. |
| 2014/0037255 | A1 | 2/2014 | Mullaney et al. |
| 2015/0093084 | A1 | 4/2015 | Cooke et al. |
| 2017/0322380 | A1 | 11/2017 | Levy |

FOREIGN PATENT DOCUMENTS

| | | | | |
|---|---|---|---|---|
| EP | 3001231 | A1 * | 3/2016 | ........... G02B 6/4446 |
| WO | WO-2018193005 | A1 * | 10/2018 | ........... G02B 6/3652 |

OTHER PUBLICATIONS

International Search Report and Written Opinion for International Application No. PCT/US2022/082016 mailing date Mar. 31, 2023.

* cited by examiner

*Primary Examiner* — Thomas A Hollweg
*Assistant Examiner* — Mary A El-Shammaa
(74) *Attorney, Agent, or Firm* — MH2 Technology Law Group, LLP

(57) ABSTRACT

The present disclosure describes apparatuses and methods for separating and installing optical fibers into furcation tubing. A modular fiber optic furcation assembly can include one or more furcation bodies, each comprising a plurality of parallel conduits oriented in a single plane and extending from a first face of the furcation body to an opposing second face of the furcation body; and an attachment mechanism to removably attach the furcation body to at least one additional furcation body on a face orthogonal to each of the first face and second face of the fan-out structure.

26 Claims, 14 Drawing Sheets

202
204
208

202
204
206
212

202
204
206
208
210

202
204
206

202
204
206
212

202
206
210

202A
202B
202A
204
200

202A
202B
202A
206
206
206
200

208
202A
202B
204
200

206
206
210
200

206
204
212
200

206
202A
202B
202A
204
200

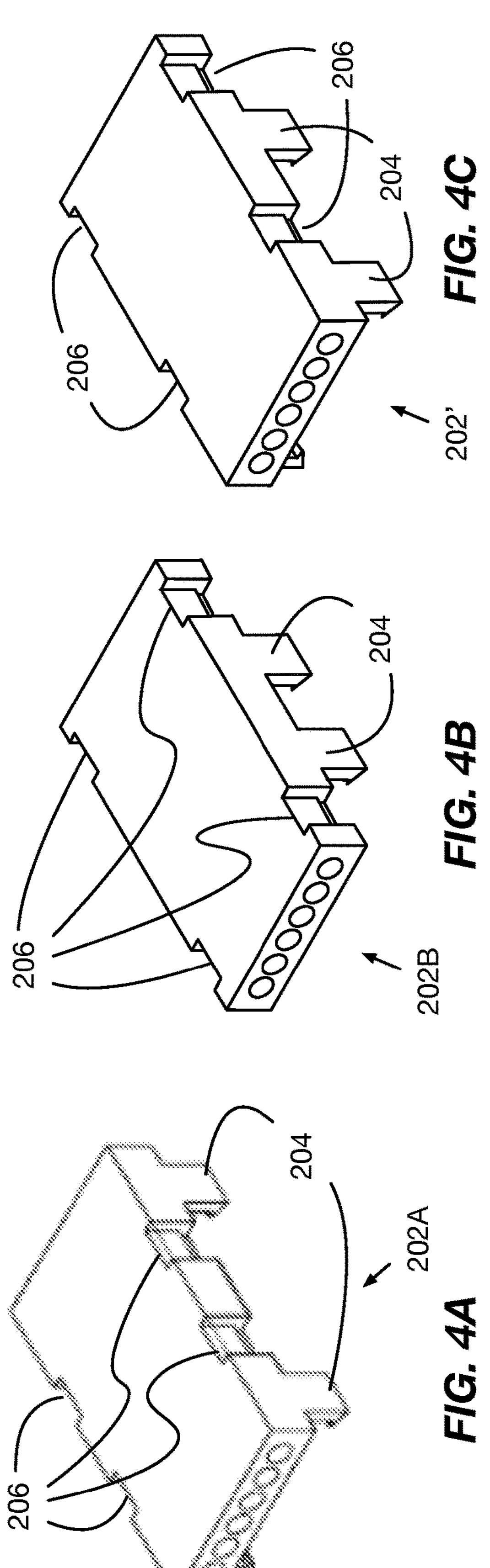
FIG. 4C
FIG. 4B
FIG. 4A
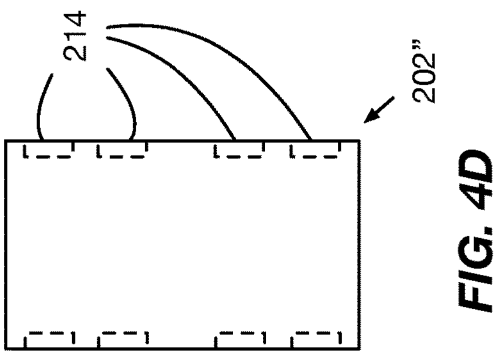
FIG. 4D

1300

1305

Provide a modular fiber optic furcation assembly

FIG. 13

APPARATUSES AND METHODS FOR MODULAR OPTICAL FIBER FURCATION

CROSS-REFERENCE TO RELATED PATENT APPLICATIONS

This application claims the benefit of and priority to U.S. Provisional Patent Application No. 63/291,916 filed Dec. 20, 2021, the entirety of which is incorporated by reference herein.

BACKGROUND

Fiber optic cables can include one or more optical fibers. The optical fibers can be coated and packaged into a cable.

SUMMARY

The present disclosure describes apparatuses and methods for separating and installing optical fibers into furcation tubing. Implementations of a furcation or fan-out kit described herein can include a modular furcation body with a single row or column of furcation conduits and tubes and attachment structures for stacking with other modular furcation bodies. Fibers can be inserted in a line, allowing a group to be inserted simultaneously without bending or pinching that can cause breakage. The number of fibers that need be handled at one time can be reduced, making installation simpler. In case of breakage or defects, a single module can be replaced rather than the entire fan-out.

At least one aspect is generally directed to a modular fiber optic furcation assembly. The modular fiber optic furcation assembly can include a furcation body. The furcation body can include a plurality of parallel conduits oriented in a single plane. The plurality of parallel conduits can extend from a first face of the furcation body to an opposing second face of the furcation body. The furcation body can also include an attachment mechanism that can removably attach the furcation body with at least one additional furcation body on a face orthogonal to each of the first face and second face of the furcation body.

At least one aspect is generally directed to a furcation body. The furcation body can include a plurality of parallel conduits oriented in a single plane. The plurality of parallel conduits can extend from a first face of the furcation body to an opposing second face of the furcation body. The furcation body can also include an attachment mechanism to removably attach the furcation body with at least one additional furcation body on a face orthogonal to each of the first face and second face of the furcation body.

At least one aspect is generally directed to a method of manufacturing a modular fiber optic furcation assembly. The method can include disposing a plurality of parallel conduits within at least a portion of a furcation body. The plurality of parallel conduits can extend form a first face of the furcation body to an opposing second face of the furcation body. The method can also include disposing an attachment mechanism on the furcation body. The attachment mechanism can removably attach the furcation body to at least one additional furcation body on a face orthogonal to each of the first face and the second face of the furcation body.

At least one aspect is generally directed to a method of providing a modular fiber optic furcation assembly. The modular fiber optic furcation assembly can include a furcation body. The furcation body can include a plurality of parallel conduits oriented in a single plane. The plurality of parallel conduits can extend from a first face of the furcation body to an opposing second face of the furcation body. The furcation body can also include an attachment mechanism that can removably attach the furcation body with at least one additional furcation body on a face orthogonal to each of the first face and second face of the furcation body.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 4A-4C are top right isometric views of the modular furcation body illustrated in FIGS. 2A and 2B;

FIG. 4D is a top view of the modular furcation body illustrated in FIGS. 2A and 2B;

FIG. 13 is a diagram of a process of providing a modular fiber optic furcation assembly;

DETAILED DESCRIPTION

The present application relates to multi-fiber optical cables. In particular, the present application relates to apparatuses and methods for separating and installing optical fibers into furcation tubing.

Fiber optic cables described herein can include multi-fiber cables with a plurality of individual optical fibers. To terminate these individual fibers at connectors or devices, the fibers can be separated using fan-out or furcation structures that can include furcation tubing. The loose fibers can be individually prepared by stripping off buffer tubes or coating material, cleaning the exposed fiber, and pushing the fibers through furcation tubes. The furcation tubes can be colored to provide visual identification of the different fibers, and can allow use of standard connectors configured for individual fibers with larger buffer tubes than those used within multi-fiber cables, as the furcation tubes can have a greater cross-sectional diameter than buffers within the multi-fiber cables.

Furcation kits can include a hard plastic furcation or fan-out body, e.g., a manifold, with a plurality of holes or conduits for individual fibers, typically arranged in a grid of multiple rows and columns. The distances between adjacent holes or conduits can be on the order of microns, making inserting fibers more and more difficult with each additional fiber. Fibers can be inserted and threaded through the long furcation tubes individually, as the proximity of other fibers can result in pinching or breakage. For example, fibers can tangle or twist together within the cable and can cross over each other when entering the furcation tubes of the fan-out body or manifold. As the body or manifold is moved closer to the buffer tube or jacket of the cable, different fibers can kink or bend between where they exit the buffer tube and where they enter the fan-out body. Even when this does not result in breakage, the bends can cause attenuation and impaired performance.

Multi-fiber optic cables described herein can include a plurality of individual optical fibers, each of which can be surrounded by a thin protective coating. Terminating these cables can involve, among other steps, extracting the fibers from a surrounding jacket or protective buffer tube. To protect the individual fibers from dust, moisture, debris, or other environmental contaminants, as well as to provide a greater outside diameter for attachment of a connector, splice, or other termination, the fibers can be inserted into furcation assemblies. Furcation assemblies can include a rigid fan-out structure, sometimes referred to as a furcation body or manifold, for maintaining a separation between and order of the individual fibers.

Figure 1A:
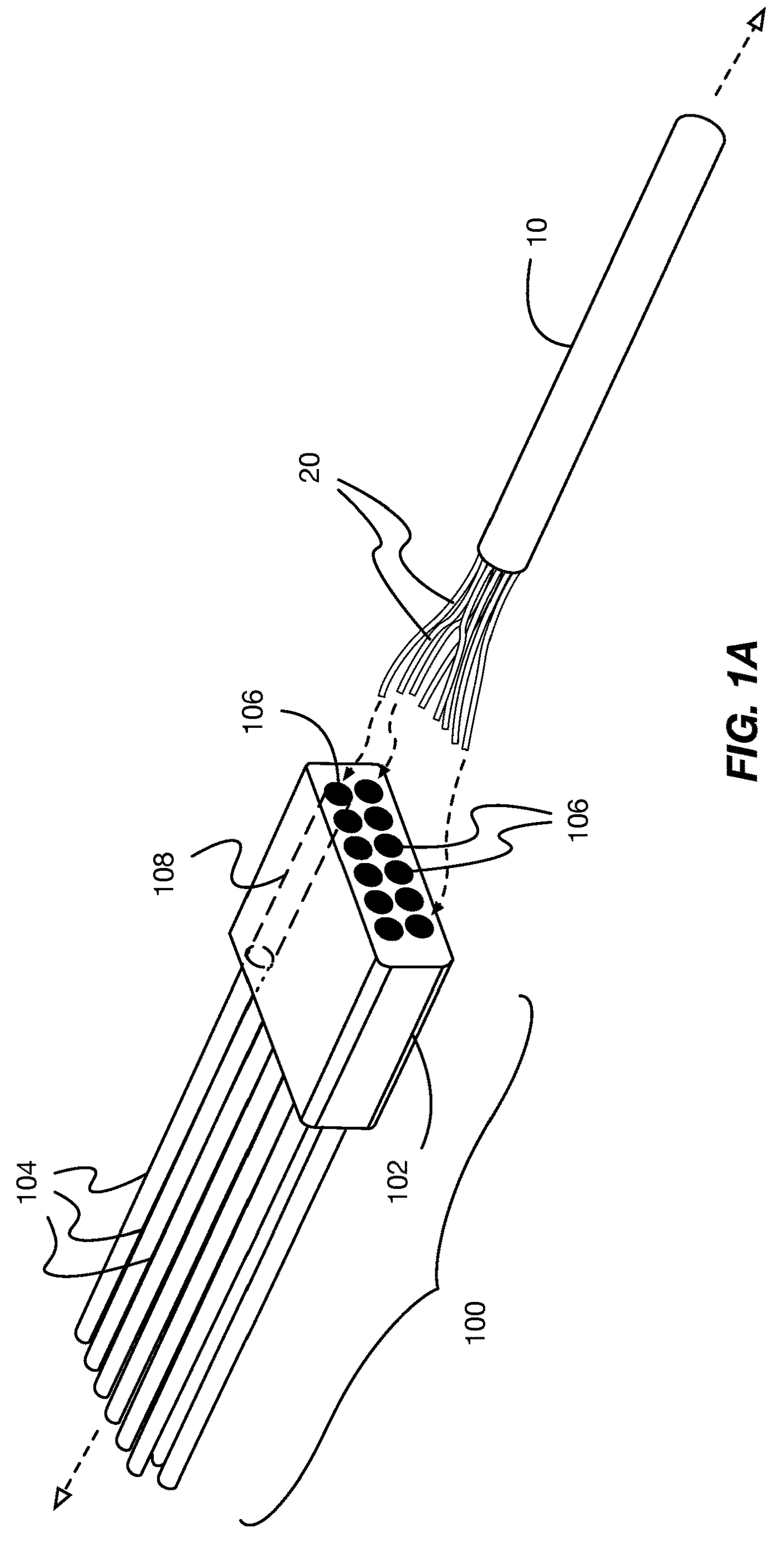
FIG. 1A is a perspective illustration of a portion of a furcation assembly.

FIG. 1A is a perspective illustration of a portion of a furcation assembly 100, comprising a furcation body or fan-out structure 102. The furcation body 102 can include a plurality of openings 106 of a corresponding plurality of channels or conduits 108 between a first face or surface (e.g. a front face) and a second opposing face or surface (e.g. a rear face) of the furcation body 102. The conduits 108 can be parallel and sized to accommodate individual fibers 20 of a multi-fiber cable 10.

The furcation assembly 100 can include a plurality of hollow buffer tubes or furcation tubes 104, each corresponding to a conduit 108. Only a portion of the furcation tubes 104 are shown in the illustration of FIG. 1A, and the tubes can extend up to 1 meter or more in length. The furcation tubes 104 can be constructed of any suitable material, such as polyvinyl chloride (PVC), polytetrafluoroethylene (PTFE or Teflon), polyvinylidene fluoride (PVDF), polypropylene, thermoplastic elastomer (TPE or Hytrel), or any other such material, and can be colored, striped, and/or otherwise imprinted or textured to distinguish individual fibers. Each furcation tube 104 can be fixed within a corresponding conduit 108 (e.g. passing through conduit 108 to a front face and bonded within the conduit 108 with a suitable adhesive or other bonding material). The furcation assembly 100 can also include additional structures or bodies not illustrated, such as a protective housing into which furcation body 102 is inserted after the fibers are installed through the furcation tubes 104. The protective housings can include attachments to a jacket or buffer of cable 10, water or dust-tight openings, screw holes or holes for cable ties or other mechanisms for fastening the assembly to another structure or assembly, etc.

To furcate the individual fibers, a surrounding jacket or buffer of a multi-fiber cable 10 can be removed or withdrawn to expose individual fibers 20. Only a portion of the individual fibers are shown for clarity; in practice, the jacket of the cable 10 can be removed to expose a greater length of the fibers, such as 0.5 meters, 1 meter, or any other such length. Accordingly, FIG. 1A should not be considered to be in scale. During installation, each fiber 20 can be separated from the others, and carefully inserted into the opening 106 and corresponding furcation tube 104 of the furcation assembly 100.

Figure 1B:
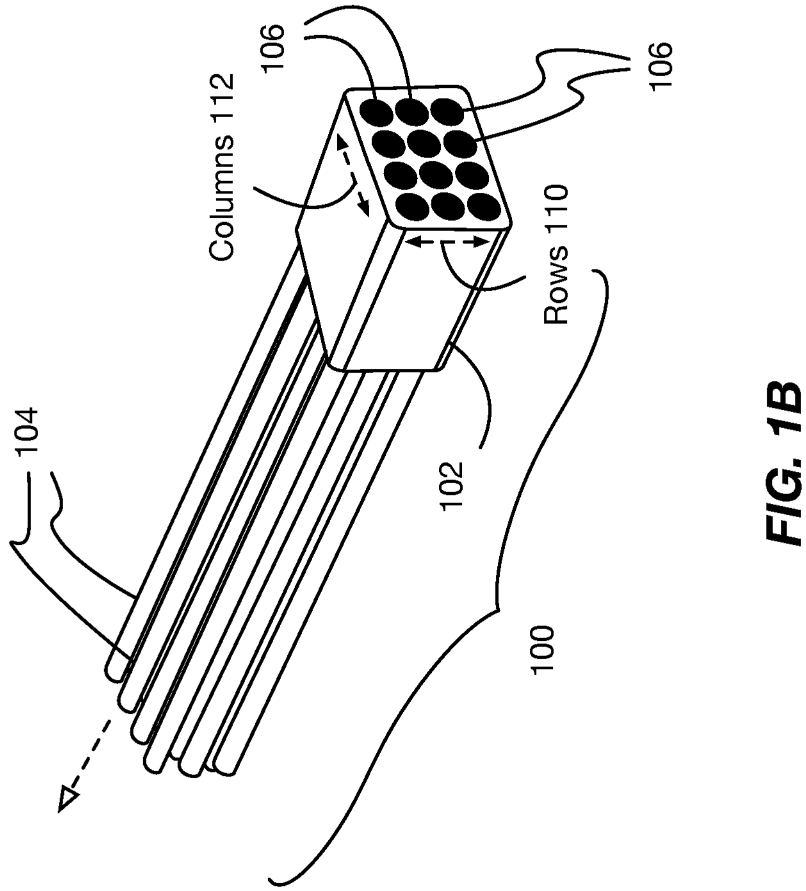
FIG. 1B is a perspective illustration of a portion of the furcation assembly illustrated in FIG. 1A.

The furcation body 102 of FIG. 1A includes 12 conduits 108 in two rows of six columns. Other arrangements can be used. For example, FIG. 1B is a perspective illustration of a portion of a furcation assembly 100, including 12 conduits in three rows of four columns. Although discussed in terms of rows 110 and columns 112 different terms can be utilized with respect to columns and rows. Conduits or furcation tubes can be referred to by position (e.g. row and column numbers) or in order (e.g. tube 1 at row 1, column 1; tube 2 at row 1, column 2; etc.).

Due to the proximity between neighboring conduits or furcation tubes (typically on the order of microns), inserting fibers can be difficult, particularly for fibers after the first. As depicted in FIG. 1B, an installer that has inserted fibers for the first row then has to carefully work around these fibers when inserting fibers for the second row. Selecting additional fibers for insertion into furcation tubes based on color (e.g. with colors corresponding to specific numbered fibers) can be difficult or frustrating, particularly when the colored furcation tubes are close together and difficult to see as more fibers are added to the assembly. Bending installed fibers out of the way when inserting a new fiber can result in a sharp bend and breakage at the edge of the furcation body, potentially requiring the installer to start the installation over from scratch. Similarly, because the fibers can be tangled or cross within the loose buffer tube or jacket (due to lack of internal separators or other orienting structures), the fibers can cross at a position close to the edge of the furcation body, which can also result in a sharp bend or breakage. Even without breakage, sharp bends in the fibers can cause attenuation and impaired performance. Additionally, as furcation tubing is typically quite long, frequently around 0.5 meters, 1 meter, or more in length, the length and number of dangling fibers and furcation tubes during installation can be unwieldy. The resulting likelihood of breakage (and potentially having to cut back fibers and start again) is high.

Instead, a furcation or fan-out kit can include a modular furcation body with a single row or column of furcation conduits and tubes and attachment structures for stacking with other modular furcation bodies. Fibers can be inserted in a line, allowing a group to be inserted simultaneously without bending or pinching that can cause breakage. The number of fibers that need be handled at one time is reduced, making installation simpler. In case of breakage or defects, a single module can be replaced rather than the entire fan-out.

Figures 2A, 2B, 2C, 2D, 2E, 2F:
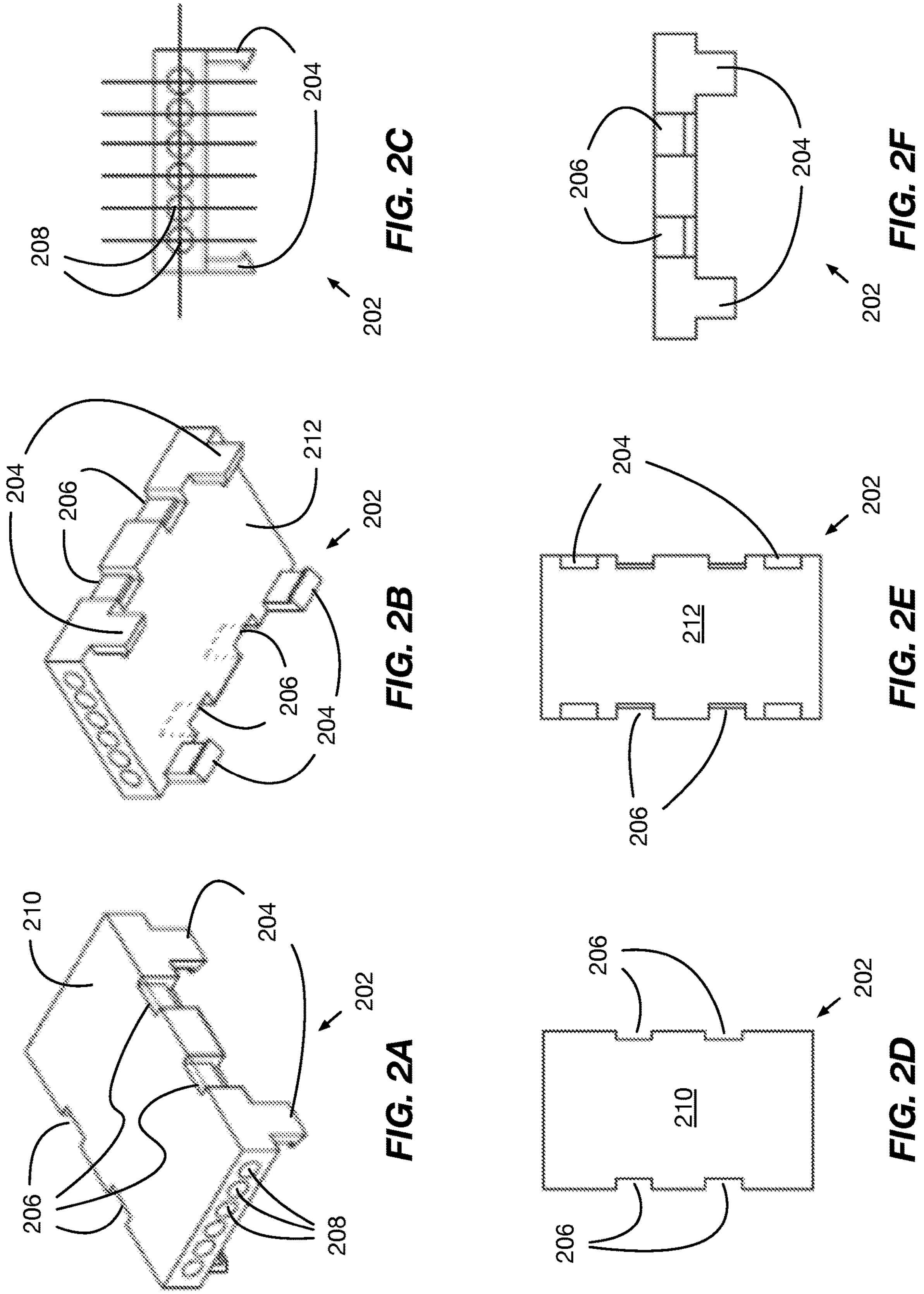
FIGS. 2A and 2B are bottom right and top right isometric views of a modular furcation body.
FIG. 2C is a front view of the modular furcation body illustrated in FIGS. 2A and 2B.
FIGS. 2D and 2E are top and bottom views of the modular furcation body illustrated in FIGS. 2A and 2B.
FIG. 2F is a side view of the modular furcation body illustrated in FIGS. 2A and 2B.

FIGS. 2A and 2B are bottom right and top right isometric views of a modular furcation body 202. The modular furcation body 202 can include at least one hole or conduit 208 extending from a first face or surface (e.g. front face) to a second face or surface (e.g. rear face). Although not illustrated, furcation tubing can be inserted through and/or fixed within each conduit. The modular furcation body 202 can include one or more attachment mechanisms, allowing the modular furcation body 202 to be attached to a top or bottom surface of additional modular furcation bodies 202 (e.g. orthogonal to the conduits). FIG. 2A depicts the modular furcation bodies 202 including a top surface or top face 210, and FIG. 2B depicts the modular furcation bodies 202 including a bottom surface or bottom face 212. FIGS. 2A and 2B depict the modular furcation body 202 including four attachment prongs 204 and four attachment notches 206. The attachment prongs 204 can be of the same or a similar plastic as the furcation body 202, and can have sufficient elasticity to spread around the body of another modular furcation body 202 during installation and return to lock within corresponding attachment notches of the another modular furcation body 202. The modular furcation bodies 202 can be detachable, e.g. by spreading the attachment prongs. The prongs 204 and the notches 206 can include and/or use other attachment mechanisms (e.g. interlocking prongs, through-holes, etc.). The attachment mechanism (e.g., the prongs 204 and the notches 206) can fix two (or more) modular furcation bodies 202 together (e.g. preventing relative motion between the bodies when attached). The attachment mechanism can prevent relative motion in two or more axes and can require additional force to detach. For example, the detachment force can be in a different direction than away from the neighboring or attached modular furcation body 202 (e.g. with the attachment mechanism preventing the bodies from being directly pulled apart, and requiring additional steps to detach, such as spreading attachment prongs, twisting, etc.). The attachment prongs 204 can include at least one hook or protruding portion to interlock with corresponding ridges within each attachment notch 204. The prongs 204 can oppose a force pulling the neighboring modular furcation bodies 202 directly apart (without first spreading the prongs).

FIG. 2C is a front view (the rear view can be substantially similar) of the modular furcation body 202, illustrating prongs 204 in profile. FIGS. 2D and 2E are top and bottom views of the modular furcation body 202.

Figures 3A, 3B, 3C, 3D, 3E, 3F:
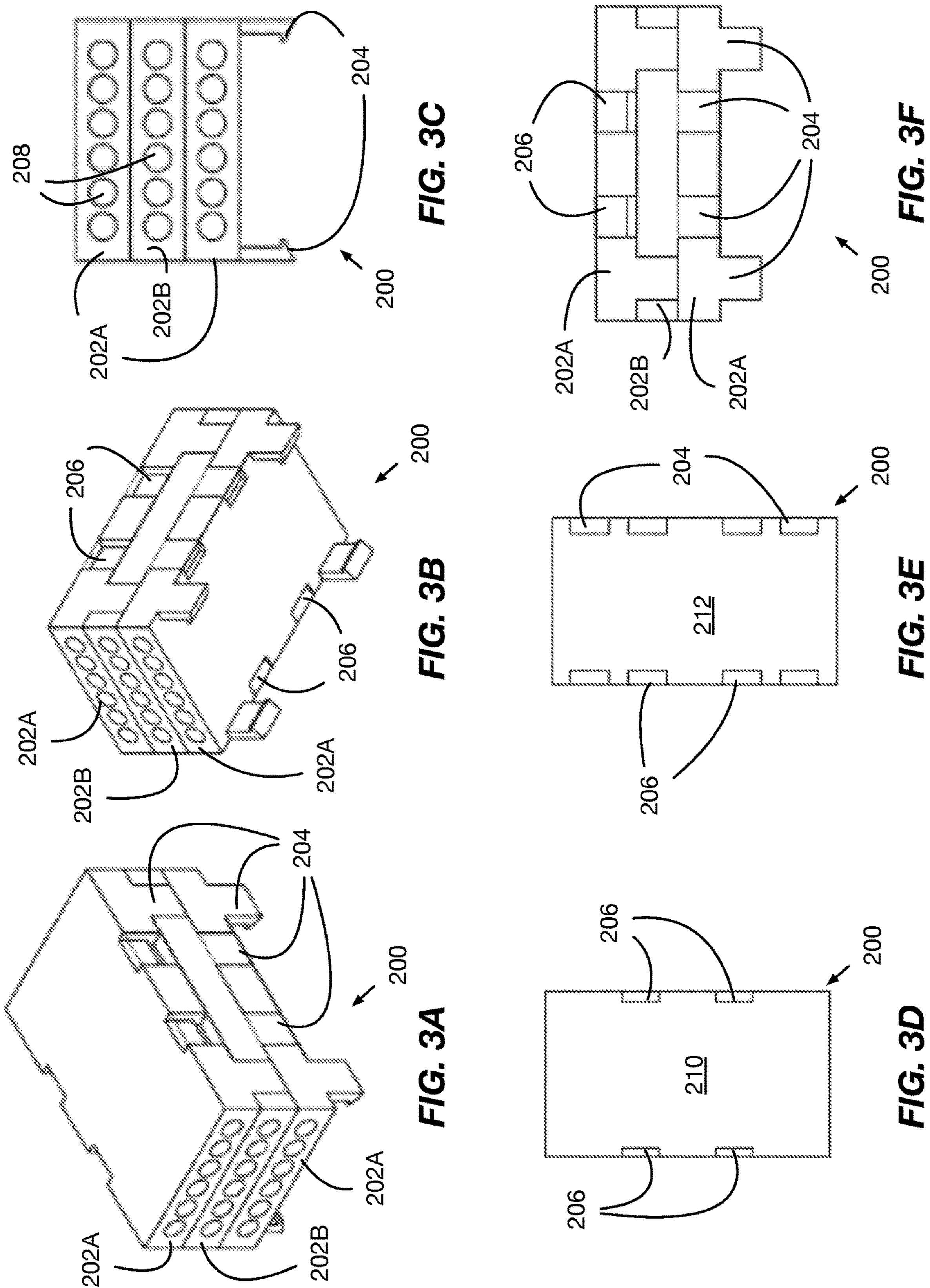
FIGS. 3A and 3B are bottom right and top right isometric views of the modular furcation body illustrated in FIGS. 2A and 2B.
FIG. 3C is a front view of the modular furcation body illustrated in FIGS. 2A and 2B.
FIGS. 3D and 3E are top and bottom views of the modular furcation body illustrated in FIGS. 2A and 2B.
FIG. 3F is a side view of the modular furcation body illustrated in FIGS. 2A and 2B.

FIG. 2F is a side view of the modular furcation body 202. The left and right sides of the modular furcation body 202 can be substantially similar. FIGS. 2A-2F depict an example of the attachment prongs 204 positioned closer to the front and rear face of the modular furcation body 202, while the attachment notches 206 are positioned closer to the center. The modular furcation kit, described herein, can include an additional modular furcation body or bodies 202 with the positions of prongs 204 and notches 206 reversed, i.e. with prongs 204 positioned closer to the center and notches 206 positioned closer to the front and rear face such that each prong of the additional modular furcation body 202 can engage a corresponding notch of the illustrated modular furcation body 202 or vice versa. For example, FIGS. 3A and 3B are bottom right and top right isometric views of the modular furcation assembly 200, including first modular furcation bodies 202A (with “outboard” prongs and “inboard” notches) and second modular furcation body 202B (with corresponding inboard prongs and outboard notches). The furcation bodies 202 can be colored coded or otherwise visually distinguishable to aid in installation.

FIG. 3C is a front view of the modular furcation assembly 200, showing a stack of modular furcation bodies 202A, 202B. As discussed above, after fibers are inserted in the furcation tubes 104, the furcation assembly 200 can be inserted into a housing or other retaining structure. The prongs 204 protruding from the bottom modular furcation body 202 can be fit into corresponding notches or holes in the housing or other retaining structure. The prongs 204 protruding from the bottom modular furcation body 202 can be removed during installation (e.g. clipped off).

FIGS. 3D and 3E are top and bottom views of the modular furcation assembly 200, and FIG. 3F is a side view of the modular furcation assembly 200 (the left and right side views can be substantially similar). The modular furcation assembly 200 can include different corresponding modular furcation bodies 202A and 202B can be utilized.

FIGS. 4A and 4B are top right isometric views of the modular furcation bodies 202A and 202B, respectively, illustrating the relative positions of prongs 204 and notches 206. The positions of prongs 204 and notches 206 can be moved so that the modular furcation body 202 is reversible. For example, the notches 206 can be positioned on a first side and/or a first portion of the modular furcation body 202 and the prongs 204 can be positioned on an opposite side and/or portion of the modular furcation body 202. The position of the notches 202 and the prongs 204 can result in the prongs 204 of a first modular furcation body 202 aligning with the notches 206 of a second modular furcation body 202 that has been rotated (e.g., by 180 degrees). The single reversibility and/or multiple orientations of the modular furcation body 202 can reduce the cost of manufacturing.

FIG. 4C is a top right isometric view of the modular furcation body 202' with alternating prongs 204 and notches 206 along each side of the body 202, such that it can interlock with a second modular furcation body 202' rotated by 180 degrees. The furcation tubes 104 can be manufactured and pre-installed with portions of the furcation tubes 104 extending from the front and rear of the modular furcation body 202', and the installer can trim off portions of the furcation tubes 104 when furcating the optical fiber. The furcation tubes 104 can also be included in the furcation kit but separate from the modular furcation body 202. The furcation tubes 104 can then be slid to the “front” or “rear” of the modular furcation body 202 based on the orientation of the modular furcation body 202.

FIG. 4D is a top view of the modular furcation body 202" with positions for prongs 204 and/or notches 206 or other attachment structures noted. The positions of the prongs 204 and/or the notches 206 can be can be different and/or switched with one another. For example, the position of the notches 206 on a first modular furcation body 202 can be different that the position of the notches 206 on a second modular furcation body 202. The position of the notches 206 on the first modular furcation body 202 can coincide with and or correspond to the position of the prongs 204 on the second modular furcation body 202. Similarly, the position of the notches 206 on the second modular furcation body 202 can coincide with and/or correspond to the position of the prongs 204 on the first modular furcation body 202.

Figure 5:
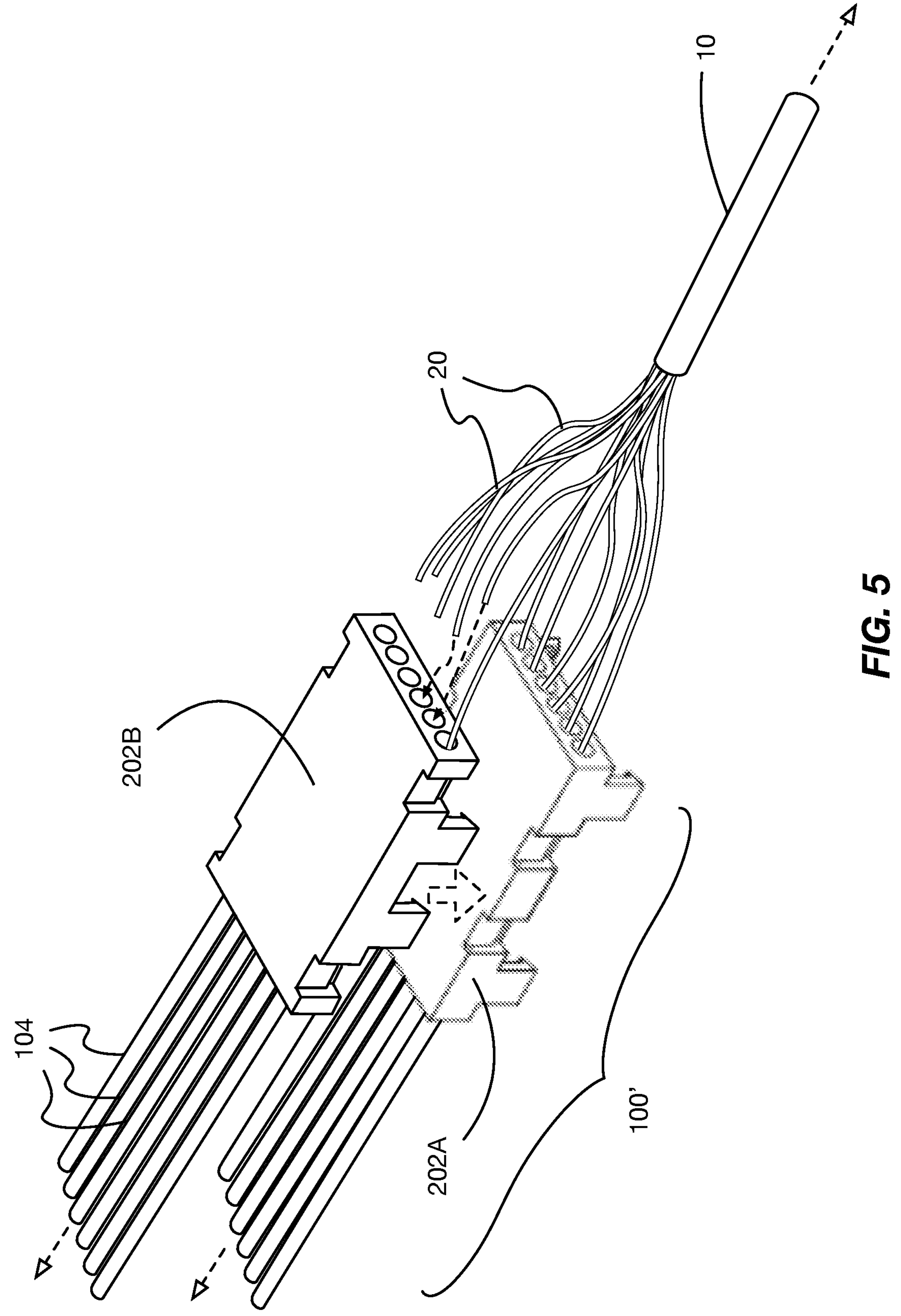
FIG. 5 is an illustration of furcation of optical fibers using a modular furcation body.

FIG. 5 is an illustration of furcation of optical fibers using the modular furcation assembly 100'. To furcate optical cables, each fiber 20 can be stripped of any coating or buffer and cleaned and inserted into and through furcation tubes 104 of a modular furcation body 202A or 202B. The multiple fibers 20 can be inserted partially into the modular furcation body 202A or 202B and or corresponding furcation tubes 104, and then advanced together in parallel to thread the fibers into the furcation tubes 104, greatly speeding up installation. Once installed, the modular furcation bodies 202A, 202B can be attached via attachment mechanisms to construct the modular furcation assembly 100'.

Figure 6:
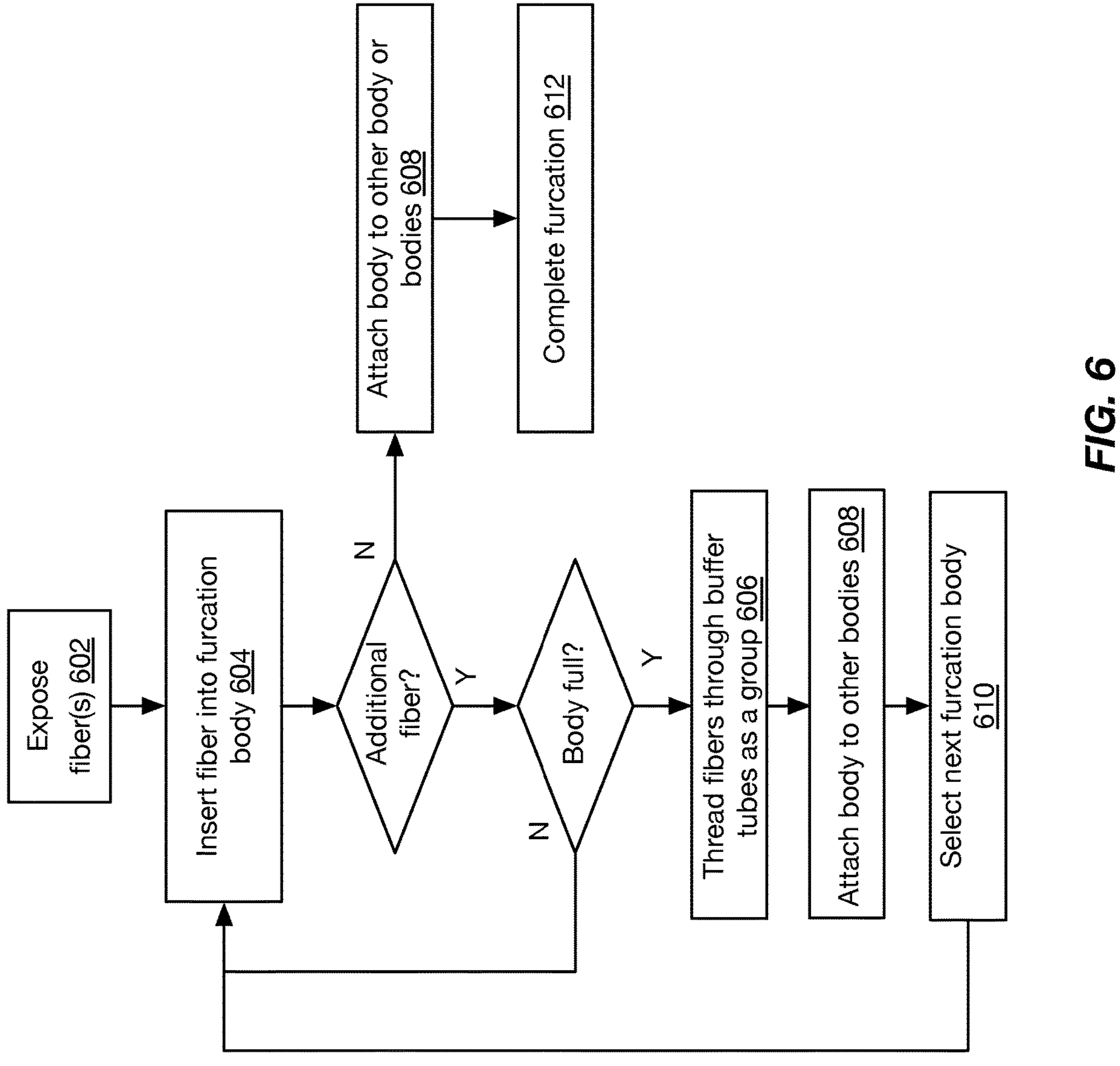
FIG. 6 is a flow chart of a method for optical fiber furcation.

FIG. 6 is a flow chart of a method for optical fiber furcation. At step 602, one or more fibers of a multi-fiber cable can be exposed. Exposing the fibers can comprise removing a jacket or buffer tube from the multi-fiber cable, and also can comprise stripping or cleaning a buffer or coating from each individual fiber. The fiber can be prepared to a predetermined length (e.g. 0.5 meters, 1 meter, 1.5 meters, or any other such length).

At step 604, the fiber can be inserted into a first portion of a furcation body. For example, the fiber can be inserted into a first portion of the modular furcation body 202. Step 604 can be performed for the additional fibers that are to be inserted into the furcation body. Each fiber when inserted can be threaded through the corresponding furcation tube. Each fiber can be partially inserted (e.g. into the furcation body and/or into a portion of the furcation tubing). Once the fibers have been inserted into the furcation body, at step 606, the fibers can be threaded into the corresponding furcation tubes as a group (e.g. advancing the fibers together in a line). Once the fibers have been threaded through the furcation tubing (either individually or as a group), at step 608, the furcation body can be attached to a previously prepared furcation body.

At step 610 a next furcation body can be selected (e.g. one with corresponding prongs or notches or other attachment structures to join to the previously prepared furcation body). Steps 604-610 can be performed iteratively for each additional fiber and/or furcation body. Once complete and/or no additional fibers remain for furcation, the bodies can be attached at step 608, and at step 612, furcation can be completed (e.g. the fiber and furcation tubes can be terminated normally (e.g. installed within a connector or splice or other housing).

Figure 7:
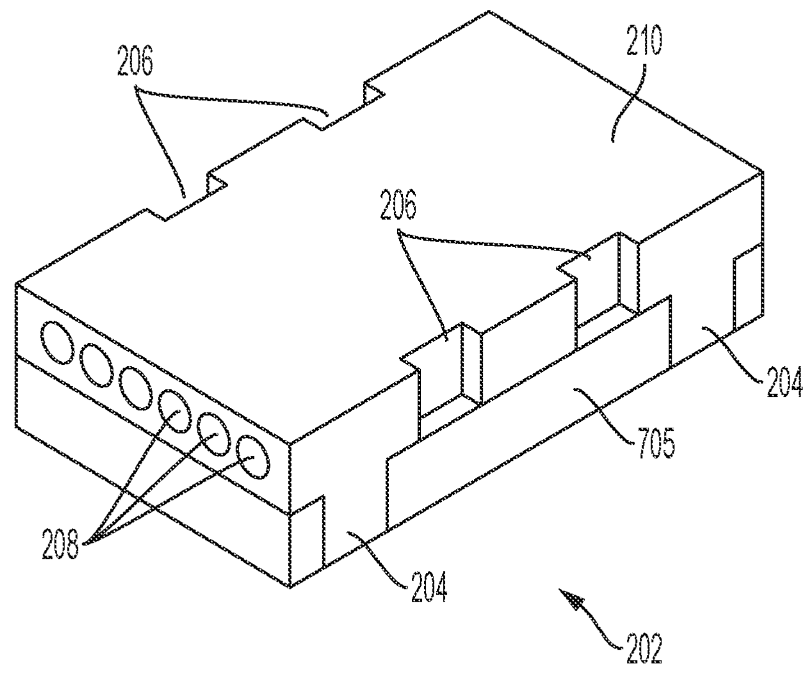
FIG. 7 is a top right isometric view of the modular furcation body illustrated in FIGS. 2A and 2B.

FIG. 7 is a top right isometric view of the modular furcation body 202. The modular furcation body 202 can include the prongs 204, the notches 206, the conduits 208, the top face 210 and the modular furcation body 202 can couple with at least one support structure 705. The support structure 705 can be or include at least one of a housing, a retaining structure or a body. The support structure 705 can receive at least one prong 204. The support structure 705 can attach, mount, place, secure or otherwise couple with the modular furcation assembly 200 and/or a portion thereof. For example, the support structure 705 can removably attach with the prongs 204 (e.g., the attachment mechanisms). FIG. 7 depicts an example of the prongs 204 removably attached with the support structure 705 on the bottom face 212 (e.g., a third face).

The conduits 208 can include at least one identifier. The identifiers can indicate at least one of a size of a first conduit 208, a type of fiber 20 that can be received by the first conduit 208 or the identifiers can distinguish the first conduit 208 from a second conduit 208. For example, the first conduit 208 can have a first color (e.g., a first identifier) and the first color can indicate the first conduit 208 can receive a fiber 20 having a size that corresponds to the first color. The identifiers can distinguish the first conduit 208 from the second conduit 208 responsive to the first conduit 208 having a first identifier and the second conduit 208 having a second identifier. For example the first identifier can be a first color and the second identifier can be a second color. The first color and the second color can be different. The first color and the second color being different can distinguish the first conduit 208 from the second conduit 208.

The support structure 705 can be removably attached with the prongs 204 responsive to an operator of the modular furcation body 202 interacting with, interfacing with or otherwise engaging the support structure 705 or the prongs 204. For example, the operator of the prongs 204 can extend, stretch, elongate or otherwise spread around a portion of the support structure 705. The prongs 204 can, responsive to the operator no longer interfacing with the prongs 204, engage with, interface with or otherwise interact with the support structure 705. The prongs 204 can, responsive to engaging with the support structure 705, removably attach the modular furcation body 202 with the support structure 705. The modular furcation body 202 being removably attached with the support structure 705 can provide stability or support to the modular furcation assembly 200. For example, the prongs 204 can make contact with a surface (e.g., a table, a desk, a ground surface, a wall) and the prongs 204 making contact with the surface can provide support (e.g., hold up or sustain the position of the modular furcation assembly 200) to the modular furcation assembly 200. The support structure 705 can make contact with the surface. The support structure 705 can, responsive to being removably attached with the modular furcation body 202 and while making contact with the surface, increase the amount of support that is provided to modular furcation assembly 200. For example, the prongs 204 can occupy (while making contact with the surface) a first amount (e.g., square footage, surface area, area of the surface) of the surface and the support structure 705 can occupy (while making contact with the surface) a second amount (e.g., square footage, surface area, area of the surface) of the surface.

The second amount can be larger than, equal to or smaller than the first amount. For example, the second amount can be larger and the second amount being larger than the first amount results in the support structure 705 occupying or making contact with a larger amount of the surface. The support structure 705 can, responsive to the second amount being larger the first amount, increase the amount of support that is provided to the modular furcation assembly by occupying a larger amount of the surface.

Figure 8:
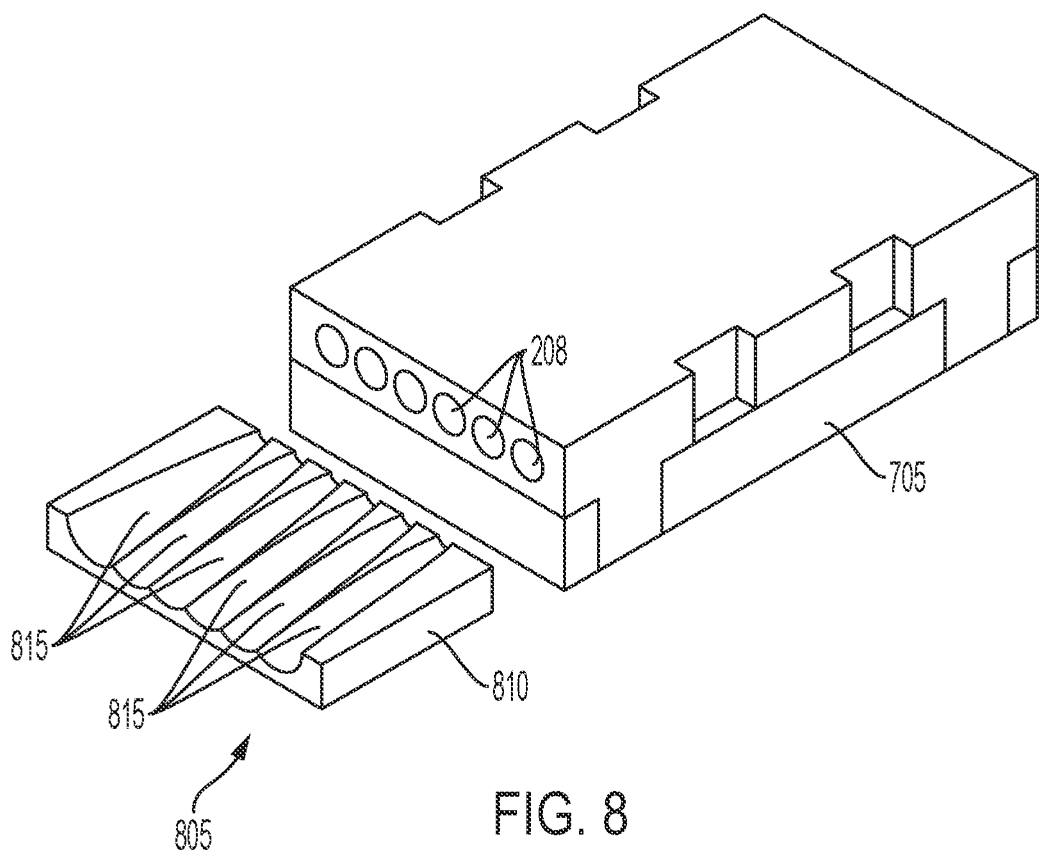
FIG. 8 is a top right isometric view of the modular furcation body illustrated in FIGS. 2A and 2B.

FIG. 8 is top right isometric view of the modular furcation body 202 and a housing 810. The modular furcation assembly 200 can include the housing 810. The housing 810 can attach, mount, secure, place or otherwise couple with the modular furcation body. For example, the housing 810 can couple with the front face of the modular furcation body. The housing 810 can include at least one portion 810 and at least one funnel 815. The portion 810 can define or include a portion of the funnels 815. For example, a piece of the portion 810 can be cut out, etched out, carved out or otherwise removed. The piece of the portion 810 that is removed can define, create or otherwise establish at least a portion of the funnels 815.

The funnels 815 can line up with, route to, or correspond to the conduits 208. For example, the funnels 815 can be positioned in front of the conduits 208 and an opening of the funnels 815 can correspond to or route to the openings of the conduits 208. The funnels 815 can receive the individual fibers 20 of the multi-fiber cable 10 or the funnels 815 can receive the multi-fiber cable 10. For example, a first funnel 815 can receive a first fiber 20 of the multi-fiber cable 10. The first funnel 815 can cover at least a portion of a first conduit 208. For example, the first funnel 815 can cover an outer surface of the first conduit 208 on the front face of the modular furcation body 202. The first funnel 815 can guide the first fiber 20 to a first conduit 208. The first funnel 815 can guide the first fiber 20 by steering, leading, directing, or otherwise routing the first fiber 20 to the first conduit 208.

Figure 9:
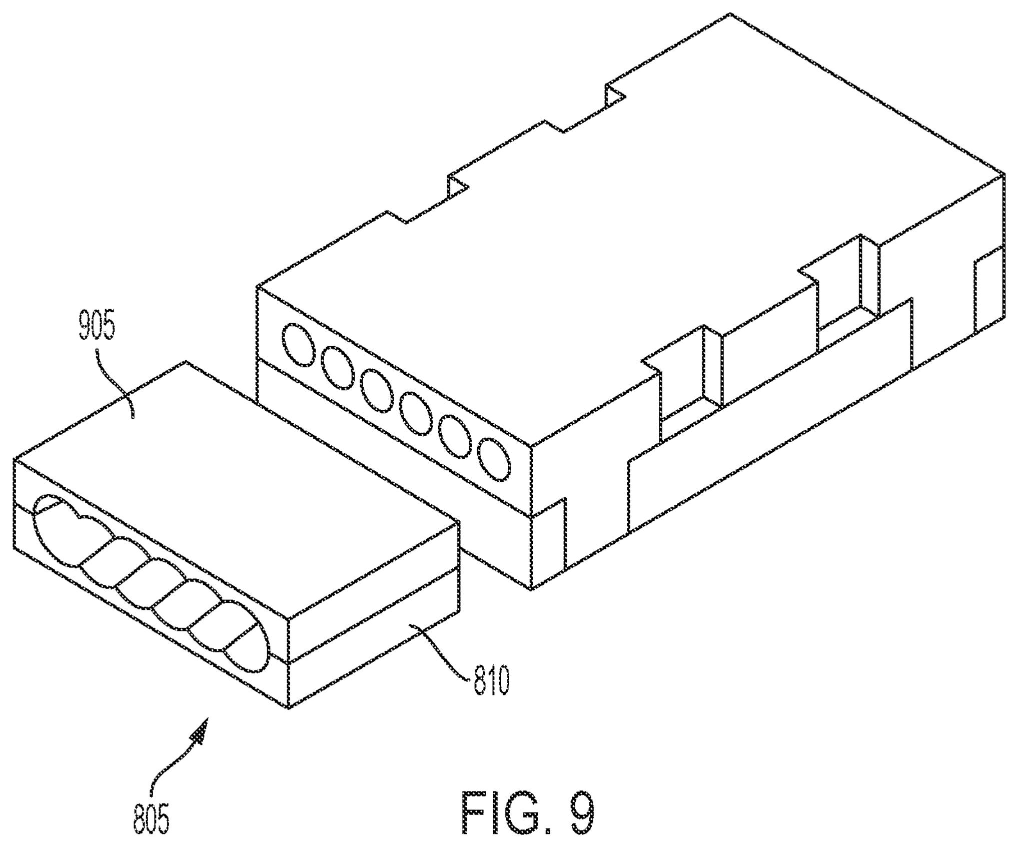
FIG. 9 is a top right isometric view of the modular furcation body illustrated in FIGS. 2A and 2B.

FIG. 9 is top right isometric view of the modular furcation body 202 and the housing 810. The housing 810 can include the portion 810 (e.g., a first portion) and at least one second portion 905. The first portion 810 and the second portion 905 can define the funnels 815. The second portion 905, similar to the first portion 810, can have a piece of the second portion 905 cut out, etched out, carved out or otherwise removed. The piece of the second portion 905 that is removed can define, create or otherwise establish, along with the first portion 810, the funnels 815. The first portion 810 can mount, attach, place, secure or otherwise couple with the second portion 905. Similarly, the second portion 905 can mount, attach, place, secure or otherwise couple with the first portion 810. FIG. 9 depicts an example of the first portion 810 coupled with the second portion 905, and an example of the second portion 905 coupled with the first portion 810.

Figure 10:
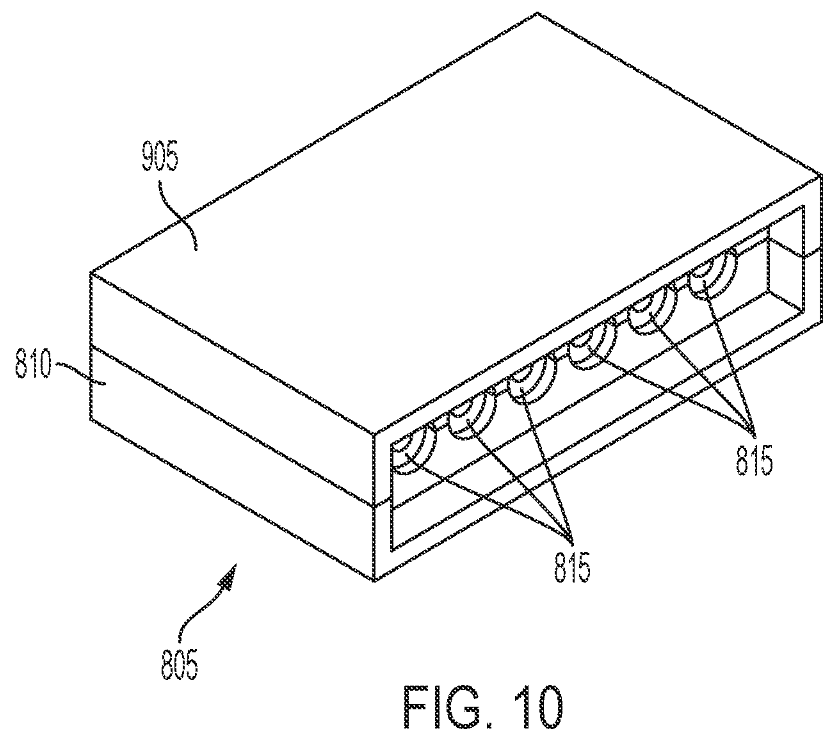
FIG. 10 is a top left isometric view of the modular furcation body illustrated in FIGS. 2A and 2B.

FIG. 10 is a top left isometric view of the housing 805. The housing 805 can couple with a first modular furcation body 202 and the housing 805 can decouple from the first modular furcation body 202. The housing 805 can, responsive to decoupling from the first modular furcation body 202, couple with a second modular furcation body 202. The housing 805 coupling and decoupling with a plurality of modular furcation bodies 202 allows a single housing 805 to be used with a plurality of modular furcation bodies 202 as the hosing 805 can be removably attached to a plurality of modular furcation bodies 202. FIG. 10 depicts an example of the housing 805 decoupled from a modular furcation body 202 either prior to the housing 805 coupling with a first modular furcation body 202 or prior to coupling with a second modular furcation body 202.

Figure 11:
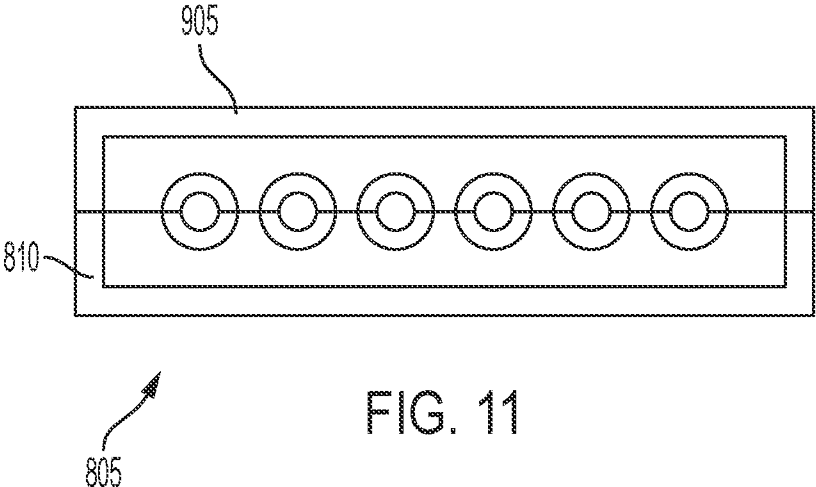
FIG. 11 is front isometric view of a housing and a modular furcation body.

FIG. 11 depicts a front view of the housing 805. The housing 805 can include the first portion 810 and the second portion 905. The first portion 810 and the second portion 905 can define the funnels 815. FIG. 11 depicts an example of the first portion 810 coupled with the second portion 905, an example of the second portion 905 coupled with the first portion 810, and an example of the first portion 810 and the second portion 905 defining the funnels 815.

Figure 12:
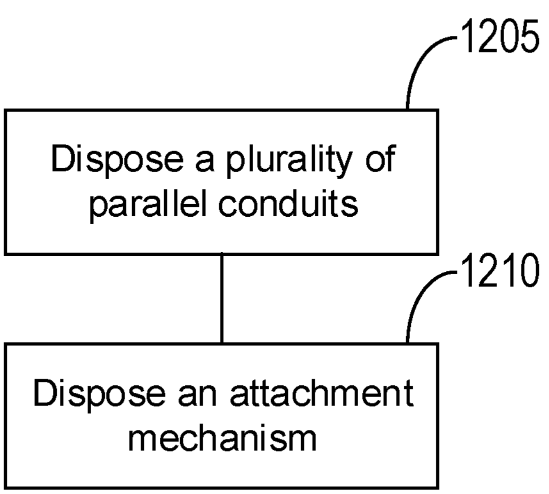
FIG. 12 is a diagram of a process of manufacturing a modular fiber optic furcation assembly.

FIG. 12 is a diagram of a process 1200 of manufacturing a modular fiber optic furcation assembly. The modular fiber optic furcation assembly can be the modular furcation assembly 200. In ACT 1205, a plurality of parallel conduits can be disposed. The plurality of parallel conduits can be the conduits 208. The conduits 208 can be disposed within the modular furcation body 202. The conduits 208 can be oriented in a single plane. The conduits 208 can extend from the front face (e.g., a first face) of the modular furcation body 202 to an opposing back face (e.g., a second face) of the modular furcation body 202.

In ACT 1210, an attachment mechanism can be disposed. The attachment mechanism can be or include the prongs 204 and the notches 206. The prongs 204 and the notches 206 can be disposed on the modular furcation body 202. For example, the prongs 204 and the notches 206 can disposed on the bottom face 212 of the modular furcation body 202. The prongs 204 and the notches 206 can be disposed on the bottom face 212 by placing, situating, positioning, or otherwise locating the prongs 204 and the notches 206 on the bottom face 212.

Figure 13:
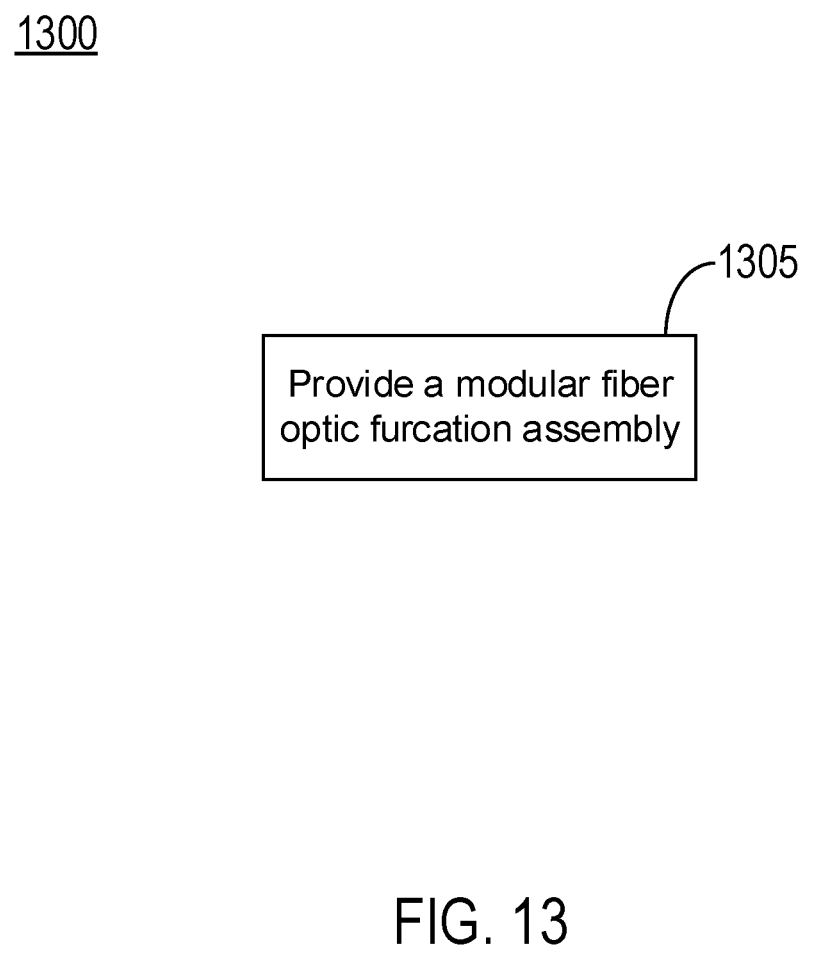

FIG. 13 is a diagram of a process 1300 of providing a modular fiber optic furcation assembly. In ACT 1305, a modular fiber optic furcation assembly can be provided. The modular fiber optic furcation assembly can be the modular furcation assembly 200. The modular furcation assembly 200 can be provided to a jobsite. For example, the modular furcation assembly 200 can be placed, located, positioned, revealed or otherwise discovered at the jobsite. The modular furcation assembly 200 can be provided upon the purchasing of the modular furcation assembly 200. The modular furcation assembly 200 can include at least one conduit (e.g., the conduits 208), and at least one attachment mechanism (e.g., the prongs 204 and the notches 206). The conduits 208 can be oriented in a single plane. The conduits can extend from a first face of a furcation body (e.g., the furcation body 202) to an opposing second face of the furcation body 202. The attachment mechanism can be removably attached the furcation body 202 to at least one additional furcation body 202 on a face orthogonal to each of the first face and the face of the furcation body 202.

Accordingly, implementations of the furcation assembly and methods discussed herein provide for faster and more efficient installation, with greater success rates and less chance of fiber breakage and loss.

The above description in conjunction with the above-reference drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

What is claimed is:

1. A modular fiber optic furcation assembly, comprising:
a furcation body comprising:
a plurality of parallel conduits oriented in a single plane and that extend from a first face of the furcation body to an opposing second face of the furcation body;
an attachment mechanism structurally configured to attach the furcation body with at least one additional furcation body on a face orthogonal to each of the first face and second face of the furcation body; and
a plurality of tubes, wherein each tube of the plurality of tubes is coupled with a corresponding conduit of the plurality of parallel conduits and is structurally configured to receive a fiber of a cable; and
wherein the furcation body is structured and adapted so that, in a first orientation, fibers of a cable can be selectively inserted into the first face such that the tubes are configured to guide the fibers out of the second face and, in a second orientation rotated 180 degrees relative to the first orientation, fibers can be selectively inserted into the second face such that the tubes are configured to guide the fibers out of the first face.

2. The modular fiber optic furcation assembly of claim 1, comprising:
the attachment mechanism of the furcation body including a plurality of notches and a plurality of prongs;

an attachment mechanism of the at least one additional furcation body including a second plurality of notches and a second plurality of prongs;

wherein a first notch of the plurality of notches is configured to receive a first prong of the second plurality of prongs; and wherein a first notch of the second plurality of notches is configured to receive a first prong of the plurality of prongs.

3. The modular fiber optic furcation assembly of claim 1, comprising:

the attachment mechanism of the furcation body including a plurality of notches and a plurality of prongs; and wherein a first notch of the plurality of notches is disposed between a first prong of the plurality of prongs and a second prong of the plurality of prongs.

4. The modular fiber optic furcation assembly of claim 1, comprising:

at least one additional furcation body including a second plurality of parallel conduits;

the plurality of parallel conduits includes a first number of parallel conduits;

the second plurality of parallel conduits includes a second number of parallel conduits; and the first number of parallel conduits and the second number of parallel conduits are different.

5. The modular fiber optic furcation assembly of claim 1, comprising:

a housing including a plurality of funnels, the housing configured to couple with at least a portion of the furcation body; and the plurality of funnels configured to guide a plurality of fibers of the cable to the plurality of parallel conduits, wherein a first funnel of the plurality of funnels covers at least a portion of a first parallel conduit of the plurality of conduits on the first face of the furcation body.

6. The modular fiber optic furcation assembly of claim 1, comprising:

a first parallel conduit of the plurality of parallel conduits that includes a first identifier; and the first identifier indicates at least one of a size of the first parallel conduit of the plurality of parallel conduits, a fiber of a cable that can be received by the first parallel conduit of the plurality of parallel conduits or distinguishes the first parallel conduit of the plurality of parallel conduits from a second parallel conduit of the plurality of parallel conduits.

7. The modular fiber optic furcation assembly of claim 1, comprising:

wherein the attachment mechanism of the furcation body, with the furcation body attached to the at least one additional furcation body, prevents the furcation body from moving relative to the at least one additional furcation body; and wherein the attachment mechanism of the furcation body is configured to detach the furcation body from the at least one additional furcation body responsive to the attachment mechanism receiving an external force, the external force including a direction that is different than the face orthogonal to each of the first face and the second face.

8. The modular fiber optic furcation assembly of claim 1, comprising:

wherein the attachment mechanism of the furcation body is configured to attach the furcation body to at least one additional support structure on a third face opposite the face orthogonal to each of the first face and second face of the furcation body.

9. The modular fiber optic furcation assembly of claim 1, wherein the attachment mechanism is configured such that the at least one additional furcation body must be rotated 180 degrees relative to the furcation body for the attachment mechanism to attach to the at least one additional furcation body to the face of the furcation body.

10. A furcation body, comprising:

a plurality of parallel conduits oriented in a single plane and that extend from a first face of the furcation body to an opposing second face of the furcation body;

an attachment mechanism structurally configured to attach the furcation body with at least one additional furcation body on a face orthogonal to each of the first face and second face of the furcation body;

a plurality of tubes, wherein each tube of the plurality of tubes is coupled with a corresponding conduit of the plurality of parallel conduits and is structurally configured to receive a fiber of a cable;

wherein the conduits are structurally configured to provide enhanced fiber furcation orientation configurations by permitting fibers of a cable to be selectively inserted into the first face such that the tubes are configured to guide the fibers out of the second face in a first furcation orientation and selectively inserted into the second face such that the tubes are configured to guide the fibers out of the first face in a second furcation orientation that is substantially reversed relative to first furcation orientation; and wherein the furcation body is structurally configured to be reversible so that, in a first orientation, fibers of a cable can be selectively inserted into the first face such that the tubes are configured to guide the fibers out of the second face and, in a second orientation rotated 180 degrees relative to the first orientation, fibers can be selectively inserted into the second face such that the tubes are configured to guide the fibers out of the first face.

11. The furcation body of claim 10, comprising:

the attachment mechanism including a plurality of notches and a plurality of prongs;

wherein an attachment mechanism of the at least one additional furcation body including a second plurality of notches and a second plurality of prongs;

wherein a first notch of the plurality of notches is structurally configured to receive a first prong of the second plurality of prongs; and wherein a first notch of the second plurality of notches is structurally configured to receive a first prong of the plurality of prongs.

12. The furcation body of claim 11, wherein the attachment mechanism is configured such that the at least one additional furcation body must be rotated 180 degrees relative to the furcation body for the attachment mechanism to attach to the at least one additional furcation body to the face of the furcation body.

13. The furcation body of claim 10, comprising:

the attachment mechanism including a plurality of notches and a plurality of prongs; and a first notch of the plurality of notches disposed between a first prong of the plurality of prongs and a second prong of the plurality of prongs.

14. The furcation body of claim 10, comprising:

a first parallel conduit of the plurality of parallel conduits that includes a first identifier; and the first identifier indicates at least one of a size of the first parallel conduit of the plurality of parallel conduits, a fiber of a cable that can be received by the first parallel conduit of the plurality of parallel conduits or distinguishes the first parallel conduit of the plurality of parallel conduits from a second parallel conduit of the plurality of parallel conduits.

15. The furcation body of claim 10, comprising:

wherein the attachment mechanism, with the furcation body attached to the at least one additional furcation body, prevents the furcation body from moving relative to the at least one additional furcation body; and wherein the attachment mechanism is configured to detach the furcation body from the at least one additional furcation body responsive to the attachment mechanism receiving an external force, the external force including a direction that is different than the face orthogonal to each of the first face and the second face.

16. The furcation body of claim 10, comprising:

wherein the attachment mechanism is structurally configured to attach the furcation body to at least one additional support structure on a third face opposite the face orthogonal to each of the first face and second face of the furcation body.

17. A device configured to provide enhanced furcation orientations comprising:

a furcation portion comprising:

a plurality of parallel receiving portions oriented in a single plane and that extend from a first face portion of the furcation portion to an opposing second face portion of the furcation portion;

an attachment portion structurally configured to attach the furcation body with at least one additional furcation portion on a face portion orthogonal to the first face portion and the second face portion of the furcation portion; and a plurality of guiding portions configured to be coupled with the plurality of parallel receiving portions;

wherein each of the guiding portions is configured to be coupled with a corresponding one of the receiving portions and is structurally configured to receive a fiber of a cable; and wherein the furcation portion is structured and adapted such that, in a first orientation, fibers of a cable can be selectively inserted into the first face portion such that the guiding portions are configured to guide the fibers out of the second face portion and, in a second orientation substantially reversed relative to the first orientation, selectively inserted into the second face portion such that the guiding portions are configured to guide the fibers out of the first face portion.

18. The device of claim 17, wherein the attachment portion of the furcation portion includes a plurality of notches and a plurality of prongs;

wherein an attachment portion of the at least one additional furcation body includes a second plurality of notches and a second plurality of prongs;

wherein a first notch of the plurality of notches is configured to receive a first prong of the second plurality of prongs; and wherein a first notch of the second plurality of notches is configured to receive a first prong of the plurality of prongs.

19. The device of claim 17, wherein the attachment portion of the furcation portion includes a plurality of notches and a plurality of prongs; and wherein a first notch of the plurality of notches is disposed between a first prong of the plurality of prongs and a second prong of the plurality of prongs.

20. The device of claim 17, wherein the at least one additional furcation portion includes a second plurality of parallel receiving portions;

wherein the plurality of parallel receiving portions includes a first number of parallel receiving portions;

wherein the second plurality of parallel receiving portions includes a second number of parallel receiving portions; and wherein the first number of parallel receiving portions and the second number of parallel receiving portions are different.

21. The device of claim 17, further comprising:

a housing portion including a plurality of funnels, wherein the housing portion is configured to couple with at least a portion of the furcation portion; and wherein the plurality of funnels are configured to guide a plurality of fibers of the cable to the plurality of parallel receiving portions, and wherein a first funnel of the plurality of funnels covers at least a portion of a first parallel receiving portion of the plurality of receiving portions on the first face of the furcation portion.

22. The device of claim 17, further comprising a first parallel receiving portion of the plurality of parallel receiving portions that includes a first identifier; and wherein the first identifier is configured to indicate at least one of a size of the first parallel receiving portion of the plurality of parallel receiving portions, a fiber of a cable that can be received by the first parallel receiving portion of the plurality of parallel receiving portions, or distinguishes the first parallel receiving portion of the plurality of parallel receiving portions from a second parallel receiving portion of the plurality of parallel receiving portions.

23. The device of claim 17, wherein the attachment portion of the furcation portion, with the furcation portion attached to the at least one additional furcation portion, prevents the furcation portion from moving relative to the at least one additional furcation portion; and wherein the attachment portion of the furcation portion is configured to detach the furcation portion from the at least one additional furcation portion responsive to the attachment portion receiving an external force, wherein the external force includes a direction that is different than the face orthogonal to each of the first face portion and the second face portion.

24. The device of claim 17, wherein the attachment portion of the furcation portion is configured to attach the furcation portion to at least one additional support portion on a third face portion opposite the face orthogonal to each of the first face portion and second face portion of the furcation portion.

25. The device of claim 17, wherein the attachment portion is configured such that the at least one additional furcation portion must be rotated 180 degrees relative to the furcation portion for the attachment portion to attach to the at least one additional furcation portion to the face of the furcation portion.

26. The device of claim 17, wherein the second orientation is rotated 180 degrees from the first orientation.

* * * * *